No. 702,013. Patented June 10, 1902.
J. H. LUBBERS.
APPARATUS FOR DRAWING GLASS.
(Application filed Sept. 28, 1900.)

(No Model.) 2 Sheets—Sheet 1.

WITNESSES

INVENTOR
John H Lubbers
by Bakewell & Bakewell
his attys.

No. 702,013. Patented June 10, 1902.
J. H. LUBBERS.
APPARATUS FOR DRAWING GLASS.
(Application filed Sept. 28, 1900.)

(No Model.) 2 Sheets—Sheet 2.

WITNESSES

INVENTOR
John H. Lubbers
by Bakewell & Bakewell
his atty's.

UNITED STATES PATENT OFFICE.

JOHN H. LUBBERS, OF NEW KENSINGTON, PENNSYLVANIA, ASSIGNOR, BY DIRECT AND MESNE ASSIGNMENTS, TO JAMES A. CHAMBERS, TRUSTEE, OF PITTSBURG, PENNSYLVANIA.

APPARATUS FOR DRAWING GLASS.

SPECIFICATION forming part of Letters Patent No. 702,013, dated June 10, 1902.

Application filed September 28, 1900. Serial No. 31,353. (No model.)

*To all whom it may concern:*

Be it known that I, JOHN H. LUBBERS, of New Kensington, in the county of Westmoreland and State of Pennsylvania, have invented a new and useful Improvement in Apparatus for Drawing Glass, of which the following is a full, clear, and exact description, reference being had to the accompanying drawings, forming part of this specification, in which—

Figure 1:
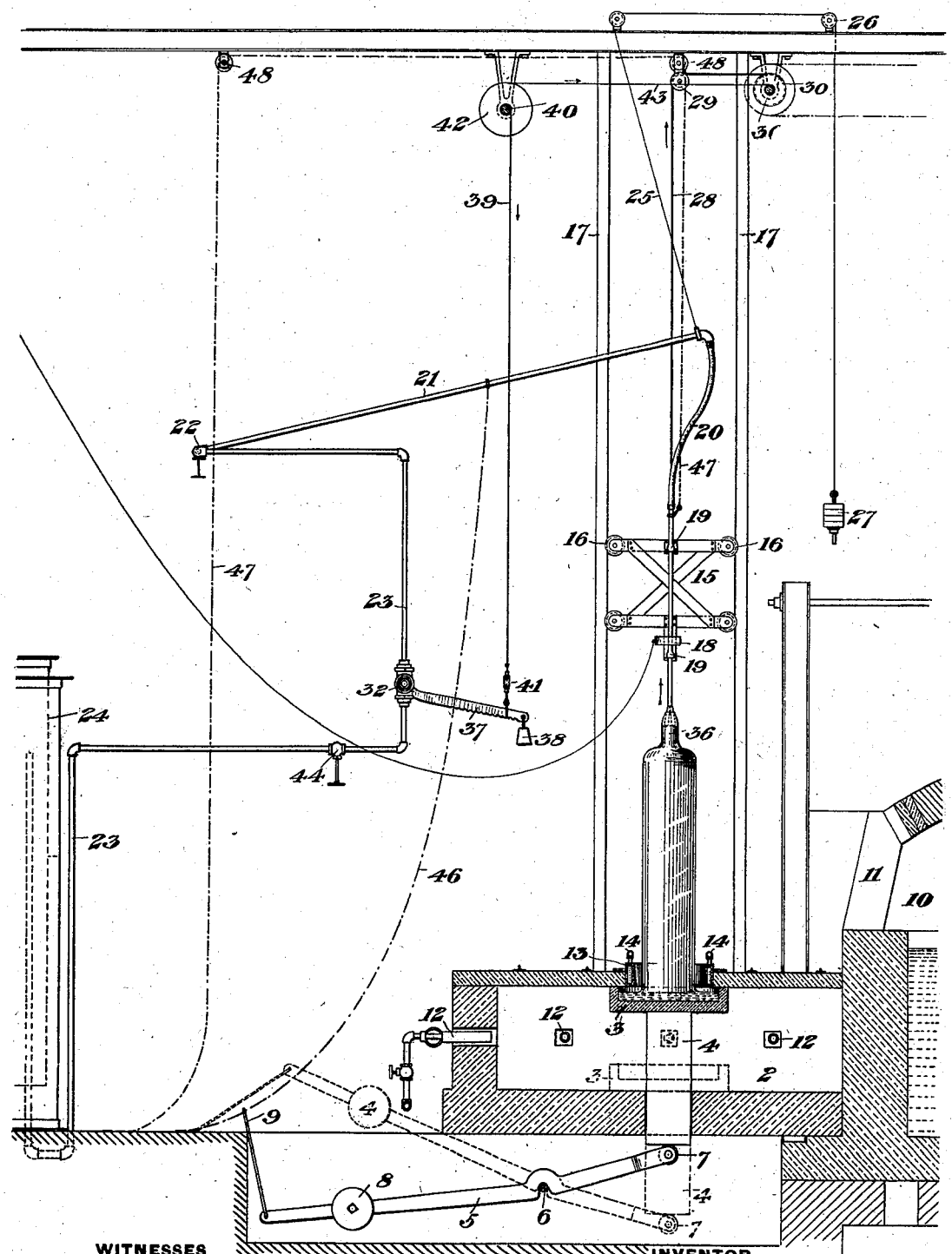
Figure 3:
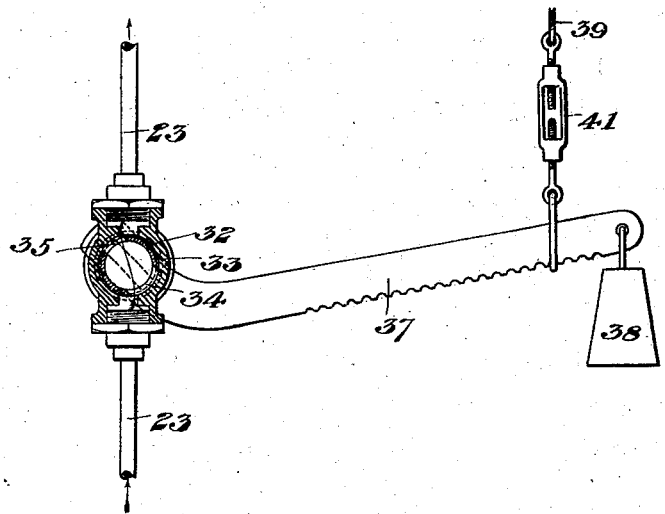
Figure 4:
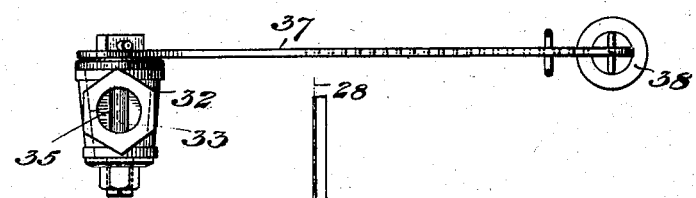
Figure 2:
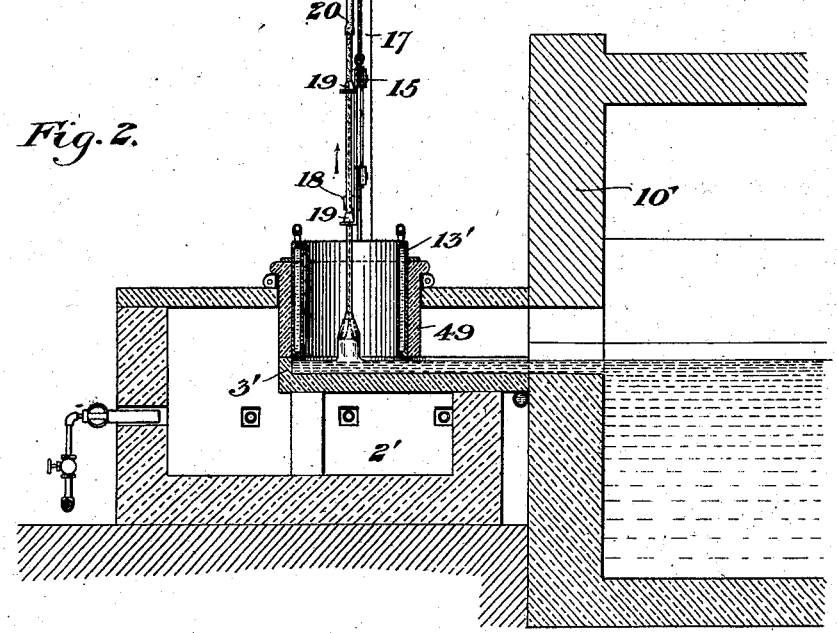

Figure 1 is a side elevation, partly in section, showing one form of my apparatus arranged for the formation of rollers or cylinders. Fig. 2 is a partial vertical section showing a modified arrangement of a furnace, and Figs. 3 and 4 are enlarged detail views of the valve controlling the air-supply.

My invention relates to the drawing of glass articles from a bath of molten glass, and is designed to provide an apparatus therefor by which practical results may be obtained, both in the formation of cylinders and as to several of its features in the formation of other glass articles, such as sheets or other shapes which are not hollow.

Referring to the accompanying drawings, which illustrate one form of apparatus for drawing cylinders, I show in Fig. 1 a heating-chamber 2, containing a vertically-movable trough or receptacle 3, of refractory material, carried on a plunger 4. This trough for the glass may be raised and lowered by a suitable lever 5, fulcrumed at 6 and having a roller 7, bearing upon the bottom of the plunger. The lever is provided with a suitable counterweight 8 and an operating link or handle 9, by which the trough may be raised to the position shown in full lines or lowered to that shown in dotted lines in Fig. 1. The chamber 2 is preferably located adjacent to a glass-tank furnace 10, having an opening 11, through which the glass may be ladled from the furnace into the trough 3, a large ladle being preferably used, which will convey enough glass for one roller, and the chamber 2 may be heated by a series of gas-burners 12, projecting thereinto, or by any other suitable means which can be properly regulated to retain the heat at the desired point. In the top of the chamber 2 is a hole which registers with the trough and in which fits a water-cooled ring 13, having a supporting lateral flange which rests upon the top or roof of the chamber. This ring is provided with suitable inlet and outlet pipes 14, by which a constant circulation of water can be maintained through its hollow interior, and the ring is movable, so that after the drawing operation is completed the trough may be lowered and the ring removed, the top hole then being closed by a suitable cover. The trough may thus be kept heated during the intervals between the drawing operations.

I have shown the drawing apparatus proper as provided with a vertically-moving cross-head or frame 15, having rollers 16, which travel along suitable guideways on the vertical side supports 17. The lower portion of this frame is provided with an adjustable pipe-clamp 18, by which a blowpipe of any usual form may be secured vertically thereto, and I show this pipe as having enlargements 19, resting upon forks projecting from the frame. Air is supplied to the blowpipe through a flexible hose 20 and a swinging pipe 21, pivoted at 22 and receiving an air-supply through pipe 23, extending from within a gasometer 24. A cord 25 is preferably secured to the swinging pipe 21, this cord extending over pulleys 26 and being provided with a counterweight 27. The cross-head 15 is moved vertically during the drawing operation by a rope 28, secured to it and extending over pulley 29 to a winding-drum 30 on a shaft 31, driven by any suitable connections.

I have found in practice that in order to keep the cylinder of substantially uniform size it is important to control the air-supply, so as to regulate it according to the length of the cylinder being drawn, and that the supply of air should be slowly and gradually increased during the drawing operation. To carry out this operation automatically, I provide the supply-pipe 23 with a regulating-cock 32, as shown in Figs. 3 and 4. This cock contains a rotary hollow plug 33, having in its lower portion a large slot 34 and in its upper portion a shorter slot 35, which is preferably of tapered shape, as shown in dotted lines in Fig. 4. A comparatively large air-supply is thus afforded at the beginning of the operation, by which, after the neck 36 of the cylinder is formed, the glass will be blown out to the desired size of the cylinder, and thereafter as the cock is automatically turned the supply is gradually and slowly increased by the forward movement of the tapered slot. The movement of the valve is preferably effected by a connection with a moving element of the apparatus. Thus I show the projecting stem of the cock-plug as provided with a lever-arm 37, having a counterweight 38 and provided with a cord or rope 39, which extends to and winds upon a shaft 40. The cord is provided with a hook, which may be adjusted along the lever to vary the movement as desired, and to adjust the valve to the desired point I provide a turnbuckle 41 in the cord 39. The shaft 40 is provided with a pulley or drum 42, upon which is wound another cord or rope 43, the other end of which is secured to the shaft 31. By this connection as the cylinder is drawn upwardly the lever 37 is gradually lowered by the unwinding of the rope 39, allowing the counterweight to gradually open the valve. The pipe 23 is also provided with a hand-controlled throttle-valve 44, by which the supply of fluid is regulated according to the size of the cylinder, the temperature of the glass, &c. The clamp 18 may be opened when the cylinder is drawn by a cord 45 within the reach of the operator.

In using my improved apparatus the trough 3 is heated and then lifted into the upper position. The water-cooled ring is then inserted in the opening of the chamber-top, and the requisite amount of glass is ladled from the furnace into the trough. A glass-blower's pipe is then provided with a ball of hot glass, and this ball is marvered so as to thin the bottom portion beneath the bell-shaped mouth of the pipe. This pipe is then secured to the cross-head by the clamp 18, with its bulb portions 19 resting on the forks, and lowered into the bath of glass in the trough. The shaft 30 then being actuated to lift the cross-head, the neck 36 is first formed by the upward drawing of the glass, and the cock then being automatically turned to give a largely-increased air-supply the glass is swelled out to the size of the desired cylinder or roller. The cross-head then continues its steady and uniform upward movement, and the air-supply is slowly and gradually increased to keep the cylinder of the same size, since any material fluctuation in the volume or pressure of the entering air or gas will of course cause fluctuation in the size of the cylinder. I have found it of the greatest importance that the air pressure should be uniform and prefer to use a gasometer, such as shown, in order to secure this uniformity, though any other apparatus may be used which will give a uniform air-pressure throughout the blowing operation. When the cylinder has been drawn to the desired length, the lifting apparatus may be stopped, preferably by an automatic stop of any desired form, and the lower end of the cylinder is then detached from the glass of the bath. This latter step may be carried out in many different ways; but I prefer to shut off the air-supply and allow the flame or gases to reach the lower end of the cylinder. The step may also be carried out by merely shutting off the air, whereupon the contraction of the air within the cylinder will draw in its lower end and close it, leaving merely a cord connection with the glass of the bath, which can be severed by the attendant. In performing this step it is necessary to allow atmospheric air to enter the blowpipe after the lower end of the cylinder is contracted as desired, since the drawing inwardly and upwardly of the bottom of the cylinder will continue until air is again admitted at the top. The severing in this manner leaves the glass in the trough in good condition for drawing another cylinder, since there is nothing retained in the glass-bath except the small cord connection, which will contact with the ball of glass of the next blowpipe and not injure the cylinder. The glass may, however, be detached in other ways, such as by shears or by admitting the heat to melt the connection. When the lower end of the cylinder is thus detached, the pipe-clamp is then pulled open and the operator draws down on a cord 46, connected to pipe 21, and then releases it suddenly, so that the weight 27 will pull the flexible pipe from the upper end of the blowpipe. The blowpipe and cylinder are then supported by means of a cord 47, secured to the pipe and extending over pulleys 48 and downwardly within reach of the operator. A fork or curved rod is then applied to the cylinder to swing it outward, and by lowering on the rope 47 the cylinder is thus laid horizontally upon a suitable support. The neck 36 or cap is then broken, and the cylinder or roller is ready for the usual operations of cracking and flattening to form the sheet. In the meantime another heated blowpipe, with the ball of glass thereon, is secured to the cross-head, and the operation of blowing the next cylinder is proceeded with. A supply of these blow-pipes may be kept heated in any convenient place adjacent to the drawing apparatus. In the form of Fig. 1 the trough is lowered during any substantial intervals between the drawing operation to keep it at the desired temperature and heat any glass remaining therein.

Instead of using a separate trough or receptacle into which the glass is ladled I may employ a receptacle which is connected with the bath of glass in the tank, so that the trough will be constantly supplied as the glass is drawn from it. Thus in Fig. 2 I show the heating-chamber 2' as provided with a stationary receptacle 3', having an extension connected to the wall of the tank-furnace 10', the hot glass resting at the same level as that in the tank and forming a shallow bath in the receptacle. In this case I preferably use a water-cooled ring 13' of much greater length than in the first form and also preferably use an annular refractory shield 49, which surrounds the water-cooled ring, both of them extending down to or nearly to the level of the glass, so as to shield the glass at the point where the article is drawn from the surrounding heat. The shielding of the glass at the point of drawing from any surrounding heat is an important part of my invention, since thereby I maintain the proper consistency or condition of the glass at the drawing-point to enable the article to hold its shape. This shielding may be carried out in different ways. Thus, for example, in the form of Fig. 1 the shield consists of the sides of the pot, which cut off the heat when the pot or receptacle is in the raised position. In the form of Fig. 2 the depending shield performs this function, and I use the word "shield" in the claims in the broad sense to include any device for preventing the access of heat to the article being drawn, and I have further discovered that the shield must be removed from the side or sides of the article a considerable distance in order to prevent the article from drawing against the shield. This distance must be at least two or three times the thickness of the article being drawn, and, further, the chilling of the glass should be carried out by radiation or convection from a cooling-ring and not by jets of air, as has been proposed hitherto, since the blasts of air will distort the shape of the article.

In either form, or in any form of the apparatus for carrying out my method, a number of the troughs with drawing apparatus for each are preferably located around the tank-furnace so that one workman may attend to the drawing of several cylinders at the same time.

The advantages of my invention are apparent, since the use of the most expensive and skilful grade of hand-labor is done away with and glass rollers or other glass articles produced automatically and mechanically. The forming of the neck at the end of the roller facilitates the severing of the roller from the pipe and simplifies the apparatus. The shielding from the surrounding heat and in such a way that the shields do not touch the article is important, especially in the forehearth form of Fig. 2. The automatic control and regulation of the air-supply contributes to the effectiveness of the method and apparatus, since fluctuations are thereby avoided, which would cause waves or corrugations in the cylinder. The gradual increasing of the air-supply as the cylinder increases in length is important to keep it of substantial uniform size. The heating of that body or portion of the general molten bath from which the article is being drawn is important, since by heating this portion and chilling the glass adjacent to the point of drawing I can control the drawing action and keep it uniform.

In so far as the apparatus herein described and claimed is applicable to drawing other forms of glass than cylinders or hollow articles the same is included herein.

Other fluids than air may be used for expanding the cylinder, and many changes may be made in the apparatus without departing from my invention.

I claim—

1. Apparatus for forming glass cylinders, comprising a receptacle for molten glass, means for heating that portion of the body of glass from which the cylinder is drawn, a shield arranged to cut off the heat from the exterior of the cylinder adjacent to the drawing-point, a bait having a fluid-supply pipe connected thereto, and connections for raising and lowering the bait; substantially as described.

2. Apparatus for forming glass cylinders, comprising a receptacle for molten glass, a source of heat arranged to heat that portion of the body of glass from which the cylinder is drawn, a shield arranged to prevent access of the heat to the exterior of the cylinder, a movable bait having a fluid-supply connection, a chilling-ring surrounding the cylinder adjacent to the drawing-point and arranged to cool it by radiation, and means for applying a cooling medium to said ring; substantially as described.

3. Apparatus for forming hollow glass articles, comprising a receptacle for molten glass, a drawing-tool, an annular chilling-ring arranged to surround the article adjacent to the drawing-point and cool it by radiation, means for cooling the ring, and an air-supply channel arranged to supply air to the interior of the article during the drawing operation; substantially as described.

4. In glass-drawing apparatus, a hollow drawing-pipe connected to a source of fluid under pressure, and mechanism for automatically regulating the fluid-supply during the drawing operation; substantially as described.

5. In glass-drawing apparatus, a hollow drawing-pipe connected to a source of fluid under pressure, a valve controlling the fluid-supply, and a connection with a moving element arranged to automatically actuate the valve during the drawing operation; substantially as described.

6. In apparatus for drawing hollow glass articles, a receptacle for molten glass, a vertically-movable frame thereover, a drawing-tool detachably fastened to the frame and connected to a source of fluid under pressure, and a cooling-ring surrounding the article adjacent to the drawing-point and arranged to cool it by radiation; substantially as described.

7. In glass-drawing apparatus, a heating-chamber, a glass-containing vessel with its bottom portion within said chamber, and a fluid-cooled ring above the level of the glass in the vessel; substantially as described.

8. In glass-drawing apparatus, a receptacle for molten glass, a heating-chamber arranged to heat the lower part of the receptacle, an annular shielding device, and a water-cooled ring within the shielding device and arranged to cool the article by radiation; substantially as described.

9. In apparatus for forming hollow glass articles, a hollow drawing-tool connected to a source of fluid under pressure, a cooling-ring arranged to chill the outer surface of the article by radiation adjacent to the drawing-point, and means for applying a cooling medium to said ring; substantially as described.

10. In glass-drawing apparatus, a hollow drawing-tool connected to a source of fluid under pressure, a hollow ring arranged to chill the exterior of the article by radiation adjacent to the drawing-point, and connections arranged to cause a flow of cooling fluid through said hollow ring; substantially as described.

11. In glass-drawing apparatus, a receptacle for molten glass, a movable bait, a fluid-cooled chilling device arranged to chill the glass by radiation, a source of heat, and a refractory shield between the chilling device and said heat; substantially as described.

12. In glass-drawing apparatus, a tank-furnace having a forehearth extension, drawing apparatus above the glass in the extension, means for heating that part of the body of glass from which the article is drawn, and a shield arranged to shield the glass adjacent to the point of drawing, from the heat; substantially as described.

13. In glass-drawing apparatus, a tank-furnace having a forehearth extension, drawing apparatus above the glass in the extension, means for heating that part of the body of glass from which the article is drawn, a shield arranged to shield the article adjacent to the drawing-point from the heat, and a cooling device arranged to chill the article by radiation adjacent to the drawing-point; substantially as described.

14. In glass-drawing apparatus, a hollow fluid-cooled ring, and an annular shield surrounding the same; substantially as described.

15. In apparatus for forming hollow glass articles, a receptacle for molten glass, a drawing device, a duct arranged to supply a fluid to the interior of the article, a cooling-ring arranged to chill the outer face of the article by radiation around its circumference, and means for uniformly applying a cooling medium to said cooling device; substantially as described.

16. In apparatus for forming hollow glass articles, a receptacle for molten glass, a drawing device above one part of the receptacle, means for heating that part of the body of glass from which the article is drawn, a duct arranged to supply a fluid to the interior of the article, a cooling-ring arranged to chill the outer face of the article by radiation around its circumference, and means for supplying a cooling medium to said ring; substantially as described.

17. In glass-drawing apparatus, a tank-furnace having a forehearth extension, apparatus for drawing glass upwardly from the extension and out of contact with any shaping-surface, and means for heating the glass in said extension; substantially as described.

18. Apparatus for forming glass articles comprising a receptacle for molten glass, means for heating that portion of the body of glass from which the article is drawn, a bait for drawing the article, means for shielding the article from the heat, and means for chilling the article by radiation adjacent to the drawing-point during its formation; substantially as described.

In testimony whereof I have hereunto set my hand.

JOHN H. LUBBERS.

Witnesses:
C. P. BYRNES,
G. I. HOLDSHIP.